United States Patent
Shenfield et al.

(10) Patent No.: US 9,116,722 B2
(45) Date of Patent: Aug. 25, 2015

(54) SYSTEM AND METHOD FOR CONTEXT AWARE DYNAMIC RIBBON

(75) Inventors: Michael Shenfield, Richmond Hill (CA); Richard Anthony Pito, Toronto (CA)

(73) Assignee: BlackBerry Limited, Waterloo, Ontario (CA)

(*) Notice: Subject to any disclaimer, the term of this patent is extended or adjusted under 35 U.S.C. 154(b) by 293 days.

(21) Appl. No.: 13/446,363

(22) Filed: Apr. 13, 2012

(65) Prior Publication Data

US 2012/0265978 A1 Oct. 18, 2012

Related U.S. Application Data

(60) Provisional application No. 61/474,991, filed on Apr. 13, 2011.

(51) Int. Cl.
*G06F 3/048* (2013.01)
*G06F 9/44* (2006.01)
*G06F 17/30* (2006.01)

(52) U.S. Cl.
CPC ........ *G06F 9/4443* (2013.01); *G06F 17/30864* (2013.01)

(58) Field of Classification Search
CPC ............... G06F 17/30864; G06F 17/30684; G06F 3/01; G06F 3/013; G06F 3/016; G06F 3/147; G06F 3/167; G06F 9/4443; G06F 11/1451; G06F 11/1464; G06F 12/0897; G06F 12/128; G06F 17/30902; G06F 8/61; G06F 17/5072; G06F 3/005; G06F 3/011
See application file for complete search history.

(56) References Cited

U.S. PATENT DOCUMENTS

| | | | |
|---|---|---|---|
| 5,021,976 A * | 6/1991 | Wexelblat et al. | 715/853 |
| 2004/0165010 A1 | 8/2004 | Robertson et al. | |
| 2005/0143138 A1 | 6/2005 | Lee et al. | |
| 2006/0288023 A1 | 12/2006 | Szabo | |
| 2007/0168586 A1* | 7/2007 | Sadovsky et al. | 710/65 |
| 2007/0171091 A1* | 7/2007 | Nisenboim et al. | 340/825.69 |
| 2008/0249969 A1* | 10/2008 | Tsui et al. | 706/46 |
| 2009/0093300 A1* | 4/2009 | Lutnick et al. | 463/26 |
| 2009/0122007 A1* | 5/2009 | Tsuzaki et al. | 345/156 |
| 2009/0174667 A1* | 7/2009 | Kocienda et al. | 345/169 |
| 2009/0199114 A1 | 8/2009 | Lewis et al. | |
| 2010/0113153 A1* | 5/2010 | Yen et al. | 463/37 |
| 2010/0121808 A1* | 5/2010 | Kuhn | 706/50 |
| 2011/0175832 A1* | 7/2011 | Miyazawa et al. | 345/173 |
| 2011/0264526 A1* | 10/2011 | Mital et al. | 705/14.55 |
| 2012/0117470 A1* | 5/2012 | Michelstein et al. | 715/709 |
| 2013/0222329 A1* | 8/2013 | Larsby et al. | 345/174 |

OTHER PUBLICATIONS

International Search Report and Written Opinion for PCT Application No. PCT/CA2012/050237, dated Jun. 20, 2012.

* cited by examiner

*Primary Examiner* — William Bashore
*Assistant Examiner* — Rayeez Chowdhury
(74) *Attorney, Agent, or Firm* — Fleit Gibbons Gutman Bongini & Bianco P.L.

(57) ABSTRACT

Predicting user actions and preemptively modifying a device in such a way as to make performing those actions easier. More specifically, a dynamic ribbon (DR) which comprises a ribbon whose contents and attributes can be changed dynamically based on anticipated user actions. The anticipated user action is facilitated by modifying the DR according to a preference to make some information available and/or make some action easier to perform.

15 Claims, 5 Drawing Sheets

SYSTEM AND METHOD FOR CONTEXT AWARE DYNAMIC RIBBON

CROSS-REFERENCE TO RELATED APPLICATION

This application claims the benefit under 35 U.S.C. §119 (e) of U.S. Provisional Application No. 61/474,991, filed Apr. 13, 2011, entitled "System and Method for Context Aware Dynamic Ribbon." U.S. Provisional Application No. 61/474, 991 includes exemplary systems and methods and is incorporated by reference in its entirety.

BACKGROUND OF THE INVENTION

1. Field of the Invention

The present invention is directed in general to communications systems and methods for operating same, and more particularly to user interfaces which include a context aware dynamic ribbon.

2. Description of the Related Art

Electronic devices have interfaces which group information for ease of use. One such grouping on handheld devices is called a ribbon which is analogous to a window or tab in desktop computing environments. A ribbon can have many attributes such as a name, e.g. "Favorites," a theme, a background, and contents. The contents of a ribbon could include informational displays, e.g. the time of day, actionable items, e.g. an icon to launch an email application, open some folder or switch to other ribbons. A ribbon has access to an area of the display screen of the device and so has the ability to control not only its contents but also where and how the contents are displayed. For example, a ribbon can be programmed to place certain items, e.g. icons, at the top of the ribbon and others at the bottom. A ribbon can also be programmed to make certain of its contents appear more salient by, for example, increasing the font used to display their names, increasing the color saturation when displaying their icons or altering their transparencies.

BRIEF DESCRIPTION OF THE DRAWINGS

The present invention may be understood, and its numerous objects, features and advantages obtained, when the following detailed description is considered in conjunction with the following drawings, in which.

DETAILED DESCRIPTION

Figure 1:
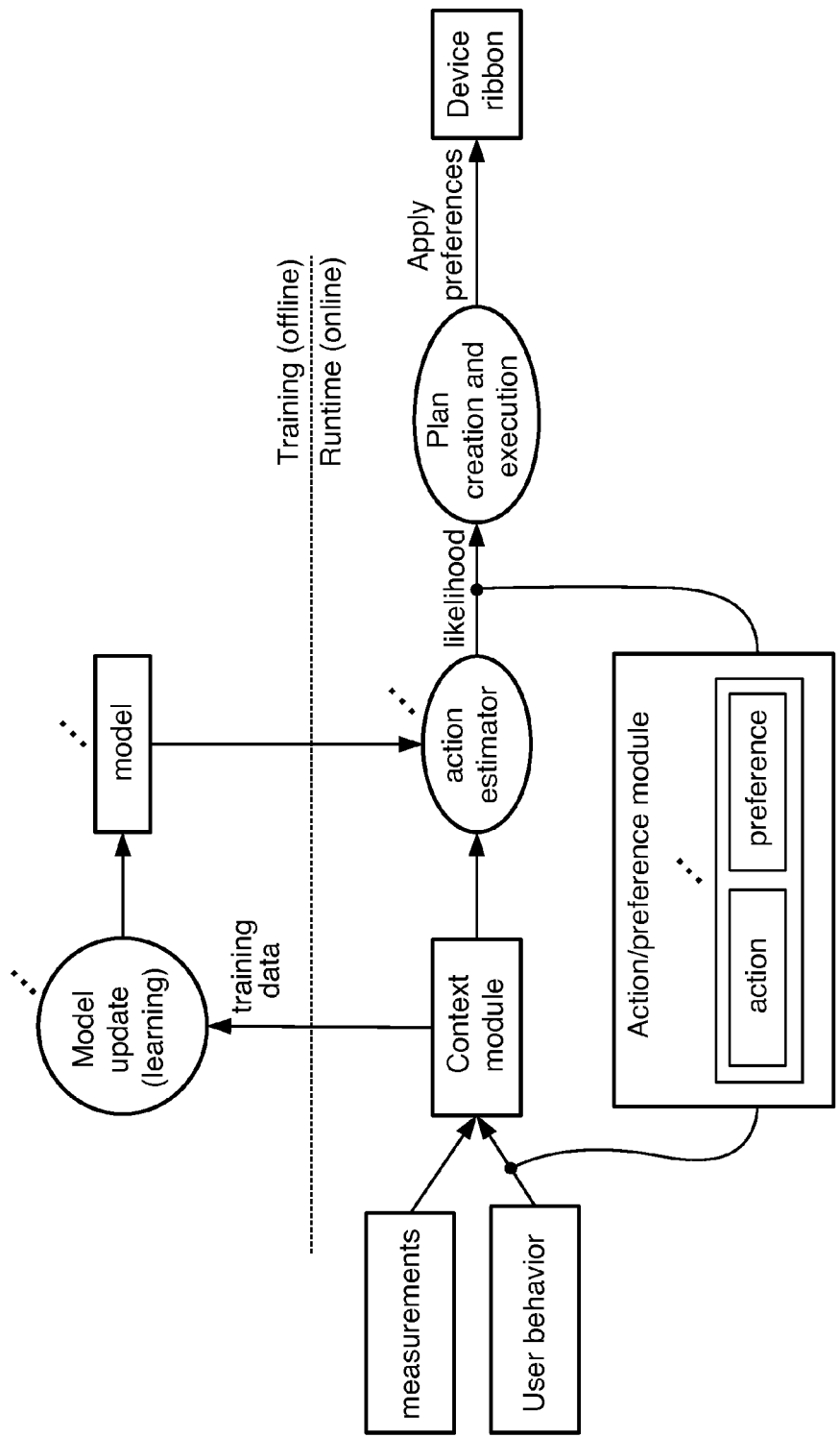
FIG. 1 shows a block diagram of data flow between data stores and objects for a dynamic ribbon.

A method, system and computer-usable medium are provide for predicting user actions and preemptively modifying a device in such a way as to make performing those actions easier. More specifically, in certain embodiments, the present invention relates to a dynamic ribbon (DR). A DR comprises a ribbon whose contents and attributes can be changed dynamically based on anticipated user actions. The anticipated user action is facilitated by modifying the DR according to a preference to make some information available and/or make some action easier to perform. For example, if it is anticipated that the user will launch a particular application within a certain, usually relatively short, amount of time, the associated preference for this action might be to make that application more easily accessible by, for example, placing access to the application at the top of the DR and also fronting the DR. In short, the preference associated with an action represents a means by which the device can make it easier for the user to perform the action.

This function can potentially save time if, for example, the device is loaded with many applications thus making finding any particular application time consuming. Other actions may be more complex such as creating icons that not only launch an application but launch the application in a specific state, for example, launching a web browser to load a specific web address. In addition, actions can include activities which alter the state of the device and not necessarily its display such as pre-fetching data that it is anticipated the user may desire. For example, when a user is about to attend a meeting, the dynamic ribbon can download to the device any attachments to the meeting invitation such as a power-point slide deck or other supporting documentation so these are ready to launch at the meeting start. In addition to caching data that it is anticipated the user may need, the dynamic ribbon may package the data in such a way as to make it easier for the user to access. For example, if it is learned that the user typically visits a website at certain times of the day or when the user's status changes (e.g. "at lunch"), the website can be preemptively fetched, rendered and an icon to access the website placed at the top of a ribbon for easy access thus improving user experience by reducing effort and time to access the data.

Various illustrative embodiments of the present invention will now be described in detail with reference to the accompanying figures. While various details are set forth in the following description, it will be appreciated that the present invention may be practiced without these specific details, and that numerous implementation-specific decisions may be made to the invention described herein to achieve the inventor's specific goals, such as compliance with process technology or design-related constraints, which will vary from one implementation to another. While such a development effort might be complex and time-consuming, it would nevertheless be a routine undertaking for those of skill in the art having the benefit of this disclosure. For example, selected aspects are shown in block diagram and flow chart form, rather than in detail, in order to avoid limiting or obscuring the present invention. In addition, some portions of the detailed descriptions provided herein are presented in terms of algorithms or operations on data within a computer memory. Such descriptions and representations are used by those skilled in the art to describe and convey the substance of their work to others skilled in the art.

Referring now to FIG. 1, a block diagram of data flow between data stores and objects for a dynamic ribbon is shown. More specifically, in certain embodiments, the DR comprises a ribbon whose contents and attributes can be changed dynamically based on anticipated user actions. The anticipated user action is facilitated by modifying the DR according to a preference to make some information more accessible and/or make some action easier to perform. For example, if it is anticipated that the user will launch a particular application within a certain, usually relatively short, amount of time, the associated preference for this action might be to make that application more easily accessible by, for example, placing access to the application at the top of the DR and also fronting the DR. Other examples of making the information more accessible can include placing the information in a well known location, using distinct fonts and/or foreground and/or background colors and using visual effects such as relative movement of some or all of the information (e.g., text). In short, the preference associated with an action represents a means by which the device can make it easier for the user to perform the action.

At runtime, each action (and therefore its associated preference) has a dynamically computed likelihood which indicates how likely the user is to perform the action and hence how important it is to execute the preference (or preferences) associated with the action. The DR is responsible for prioritizing the preferences presented to it according to their likelihoods, to develop a consistent plan for their implementation and to carry out that plan. For example, to implement the preference to display the time the DR may place a clock in its title showing the current time or place a large clock in the background of the entire DR. If the plan implements the intention of a particular preference we say the preference has been satisfied. The way in which a preference is implemented is not necessarily fixed a-priori but can vary depending on the way the user has historically interacted with the device.

Action estimators are responsible for periodically estimating the likelihood of each action. Normally, most if not all actions will have a likelihood of zero implying that it is not expected the user will imminently perform that action and so there is no need to alter the DR. The estimators use information gathered from a context to perform their tasks. A context is, in general, any information that can be used to characterize a situation Examples of contextual information are measurements of a device property, data gathered from applications running on the device, data gathered from off-device sources via some communications channel and/or data derived thereof, called cues. For example, directly measured device properties include things like battery level, whether the device is holstered or which applications are running. Examples of data that can be acquired from applications include things like the next scheduled meeting time for the user, the closest movie theater or the movies playing at that theater. Examples of derived measurements are things like the user is late for a meeting (derived from the current time and data from a calendar application), the user is in a moving vehicle (derived by analyzing the time series of GPS coordinates) or the user is near a restaurant that some of his friends have "liked" (derived from GPS, mapping services and access to social media services).

Although estimators can be simple, a DR becomes truly useful when the estimators can optimize their behavior by learning the preferences of the individual user of the device. This learning can be achieved by taking note of user behavior, that is, the actions that a user performs and in particular in which context they are performed. For example, towards the end of every business day as the user exits his building and begins his drive home he launches a traffic application (such as e.g., the Blackberry Traffic Application). In this case the preference is "make traffic app easier to launch" (or even to "launch the traffic app") and the context would include things like the time of day, whether the user has exited his office building (e.g. by measuring an increase in GPS signal strength), and/or whether the user is actually moving in a vehicle e.g. by measuring and analyzing accelerometer readings).

More specifically, user behavior represents all the user actions that a user may perform such as launching applications or performing some set of pre-defined configuration tasks like setting the ringer to vibrate. Launching applications can include launching applications with specific parameters such as calling a specific number or contact. For example, an action may be user calls (555) 555-5555 and an associated preference may be to place an icon on the DR that when pressed automatically calls (555) 555-5555. Measurements and cues include information that can be gathered from the device, by the device and derivations thereof. The context module provides a store of time-stamped measurements, cues and user actions. As much historical data is kept as possible. The context module may also be referred to simply as context. The action estimator includes an algorithm that determines a likelihood of a particular user action within a certain amount of time. This algorithm is predictive as it tries to predict that the user is about to perform some action. The module comprises configuration information used by an action estimator that can be modified over time to improve its performance. The model update includes an algorithm that examines the data store and a model and attempts to improve the performance of the model. The action/preference module provides a store of action/preference (or preferences) relationships. For example, these relationships may be things like "user launched application X"/"place icon for application X at top of dynamic ribbon". When the action estimator predicts this action will occur the associated preference will be executed thus making it easier for the user to perform an action. The plan creation and execution includes an algorithm that examines the likelihood measures from each action estimator, determines any preferences that need to be implemented given the current state of the dynamic ribbon, prioritizes and then executes them.

In general an action estimator can be represented by a conditional probability $P(A|C)$ where A is some user action and C is the current context. Note that the context variable C is bolded to indicate that it is a random vector and so includes multiple measurements. There are many ways to estimate this conditional probability. In certain embodiments, techniques from supervised learning are used and in particular a logistic regression can used to estimate $P(A|C)$. The estimation process is called training and uses training data.

Training data includes examples of the user performing the action and examples of the user not performing the action. Let a represent a particular user action of interest. Then a=1 when the user has performed the action and a=0 when he has not performed the action. The system gathers a set of n of these actions for the training data, e.g. $a_1 \ldots a_n$. Along with each of these examples $a_1$ is also recorded at the same time the context which is represented as a vector $c_i=(c_{i,1}, c_{i,2}, \ldots, c_{i,m})$ of m features. Note that the term features is common in the machine learning literature and corresponds to measurements and cues and thus these terms may be used interchangeably. The training data $t_n=((c_1,a_1), \ldots (c_n,a_n))$ for a particular action estimator then includes a set of n training examples. Note that when the user performs an action it is easy to acquire a positive training example (a=1,c) as the user has just performed the action. In order to acquire negative training examples (e.g. (a=0,c)), we will periodically sample the context, say every 30 minutes. In addition, negative examples can be generated for an application when other applications are launched or some other event occurs for which we can subscribe, e.g. the device has been holstered.

Figure 2:
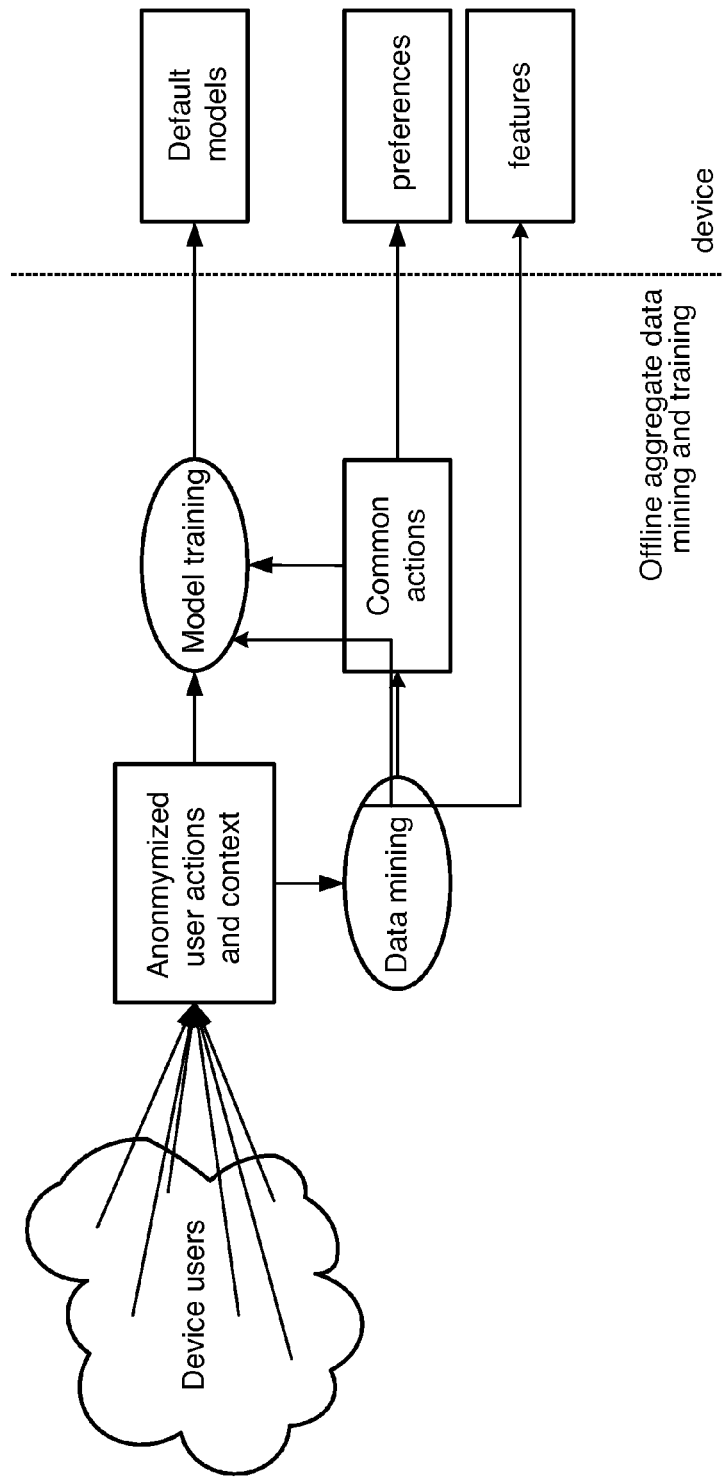
FIG. 2 shows a block diagram for a process of data mining aggregate user behavior.

Referring to FIG. 2, a block diagram for a process of data mining aggregate user behavior is shown. More specifically, there are many ways to estimate a model given training data.

One would be to use maximum likelihood to generate the parameters for a generalized linear model $\beta=(\beta_0, \beta_1, \ldots \beta_m)$ where each $\beta_j$ is the coefficient in a linear equation. In this case the likelihood of a user event is given by $l=g(\beta^T c)$ where $g(\ )$ is a known function.

The initial contents of a training set for an action can either be empty or can include a default set of training data. In the former case, the model is empty and predicts a likelihood of zero for each action. In either case, over time, new training data derived from the device's user can be added to the training set and the model re-created. As more data is gathered it is expected that the predictive performance of the model improves and the dynamic ribbon becomes more personalized to the user.

Initial training sets can be created to represent the average user and can be created by aggregating large amounts of anonymized training data from multiple devices. In fact, the mining of data sets of aggregate user behavior can be used to generate lists of the most common actions and features that may have predictive power. For example, by analyzing large amounts of user data one may discover the most frequent user actions or which user actions have the minimum variance in context and so would make good candidates for user actions that could be personalized. These would be the user actions for which preferences were created, e.g. a definition of how to make it easier for the user to perform each action. In addition, large collection of contexts can be used to identify those features that have the most predictive power or even to identify derived features that have utility. For example, a derived feature could be based on the set of clusters of user context derived from anonymized training data. In this case, the derived features would be the distance of a context to the centroids of each cluster. The process of data raining aggregate user behavior is depicted in FIG. 2

The offline portion (to the left of the vertical dashed line of FIG. 2) is performed off-device by a remote service. The default models, preferences and features are delivered to the device and the process of acquiring user-specific training data begins.

After a certain amount of user-specific training data is accumulated, the models are updated. Depending on the complexity of the model and the size of the training data, training may be performed on the device itself or off-device by a remote service. If training is performed off-device, then the user-specific training data is transmitted to the training service where it is added to any previously received training data from that user (aggregated user-specific training data) and perhaps some or all of the anonymized training data. A new model is created from a combination of these data sets and transmitted back to the device.

Figure 3:
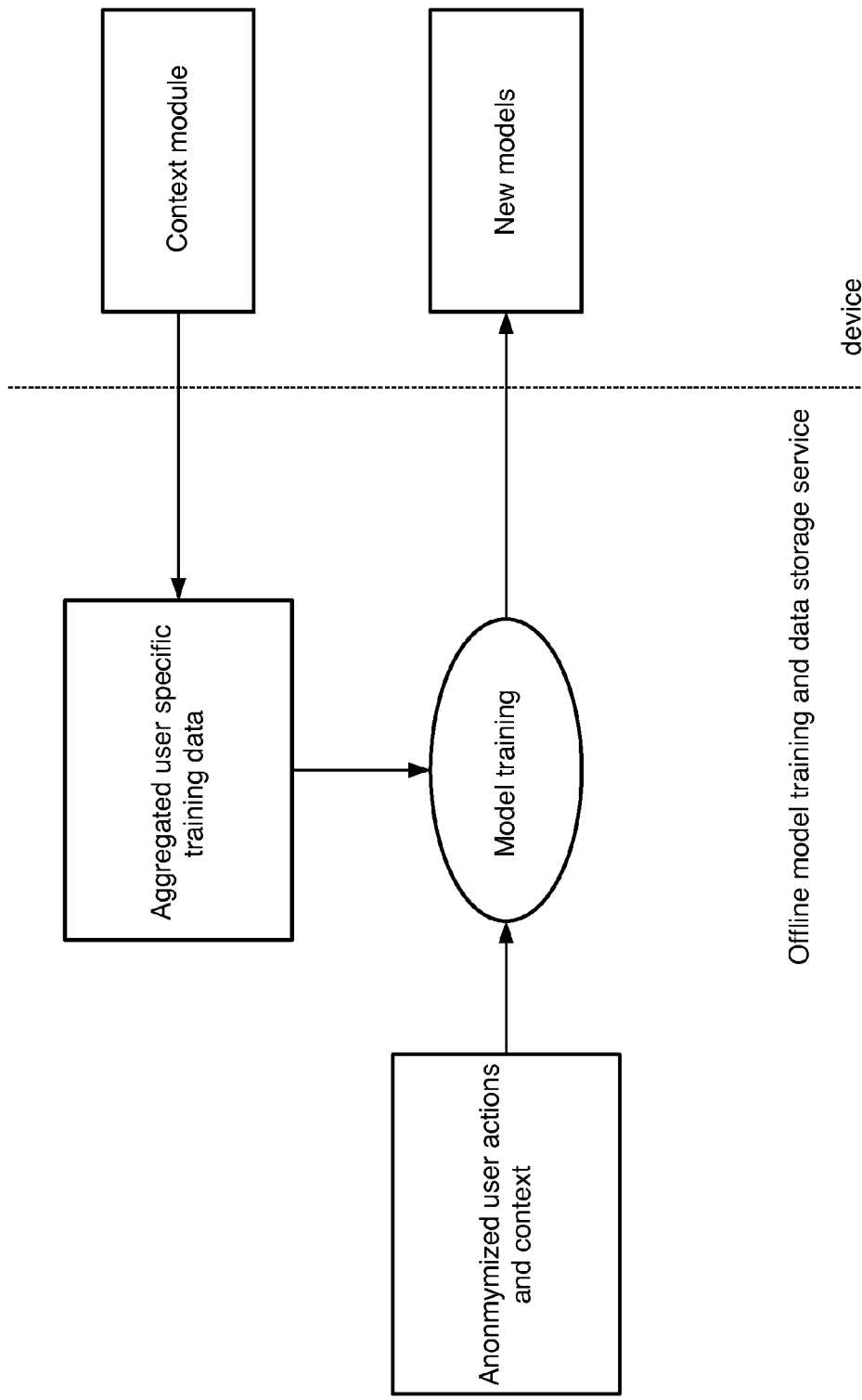
FIG. 3 shows a block diagram of a process of model training.

Referring to FIG. 3, a block diagram of a process of model training is shown. More specifically, to evaluate the set of action estimators, contextual elements from which they depend are determined. For example, say a model depends on the contextual items $c_1$="hour of day" and $c_2$="number of meetings left in the day". Measurements for these context variables can be generated by sampling the clock and by querying a meeting scheduler. These requests are made to appropriate measurement tasks which enter information into the context store when these measurements change. When new information is entered into the context store, this triggers the execution of any action estimators which then compute a likelihood. If any likelihoods change, the plan creation and execution task is executed.

Given a set of likelihoods $(l_1, \ldots l_k)$ for the k actions we are monitoring we can order these by their numerical value and remove those below some threshold. A plan is then created which implements the preferences associated with the remaining top h actions (if there are any) with priority given to those preferences with higher likelihoods. The preferences are then applied to the dynamic ribbon. For example, the system may estimate that there is a high chance that the user will launch a traffic application (such as the Blackberry Traffic Application) given the time of day, e.g. 6 pm, and the number of meetings left in the day, e.g. 0, and the fact that the user has taken this route many times in the past, e.g. historical analysis of GPS data. The preference in this case is to make it easy to launch the application and the dynamic ribbon places an icon for the traffic application at the top, highlights it, makes the dynamic ribbon visible and un-highlights other applications in the ribbon by, for example, graying them out or even hiding them altogether.

A specific example of how a dynamic ribbon is created, trained, used and customized over time is now presented. More specifically, the process begins by identifying salient user actions and their associated preferences (e.g. how to facilitate the action). By performing a cluster analysis of the contexts from may users in an anonymized data set, it is discovered that many users find themselves in a context called, say, D that is characterized by rapid movement as measured by GPS, motion patterns, as measured by an accelerometer, and consistent times of day. In addition, some contexts include a cue that the user is in the driver seat of a car that is derived from the measurements of pressure sensor in a car's driver seat. One can think of this cluster as representing those contexts where a user is Driving. By analyzing what people do in these contexts a plurality of user actions may be determined.

| Percentage of users | User action | Preference |
|---|---|---|
| 70% | Activate Bluetooth | Config change |
| 65% | Activate voice dialing | Launch app |
| 60% | Launch Google traffic app | Launch app |
| 55% | Launch BB traffic app | Launch app |
| 50% | Switched to "read my email" mode | Config change |
| 15% | Use IM | Launch app |
| 8% | Type email | Launch app |

Note that since each user can perform multiple actions the percentages can total more than 100%.

Associated to each action is a preference on how to facilitate that action. In the present example, there are only two types of preferences. The launch app preference is distinguished from the config change preference because the former can be performed by the user by finding an application icon and launching it, while the later requires navigating device menus and setting/unsetting preferences. This distinction is made since for the config change preference, an artificial application and icon may be created that performs the setting changes as opposed to actually launching an app.

A default model/action estimator pair for each user action is created that is consistent with the anonymized data. Thus, if the anonymized data set is randomly sampled and if a sample context had associated with it the action of activating Bluetooth, then the "activate Bluetooth" estimator will assign to that context a high likelihood. Similarly, that estimator would assign a low likelihood to those contexts where the user did not activate their Bluetooth. Note that although a model is really a set of data and an action estimator is an algorithm that uses a model, these terms are used interchangeably. These default models, along with the features needed to compute them, are loaded onto a device. These models will be updated when enough user-specific data has been acquired.

During use, the action estimators will be triggered by various events to compute likelihoods based on the current context. In this case, we can implement every preference by either performing an action (launching an app or making a config change) or by presenting an icon to perform the action (the app icon itself, or an "artificial" icon to perform the config change). Here is a sample schedule of what to do with a preference given a likelihood:

| Likelihood >= | How to implement preference |
|---|---|
| 0.90 | Launch application/perform config task |
| 0.50 | Place icon in top row of ribbon |
| 0.40 | Make icon larger than others |
| 0.35 | Make icon more "vivid" than others |
| 0.20 | Increase opaqueness of icon on ribbon |
| 0.10 | Ensure iconis on ribbon |
| 0.00 | Make icon transparent and/or remove from ribbon |

Furthermore, if any likelihood was greater than or equal to 0.10 then one should front the dynamic ribbon and play a distinctive sound.

For example, if at a particular point in time he action estimators produce these likelihoods:

| Action estimator | Likelihood |
|---|---|
| Activate Bluetooth | 0.93 |
| Activate voice dialing | 0.04 |
| Launch Google traffic app | 0.66 |
| Launch BB traffic app | 0.38 |
| Switched to "read my email" mode | 0.25 |
| Use IM | 0.01 |
| Type email | 0.01 |

Then certain actions would be taken. More specifically, these actions might include activating Bluetooth, placing a large, highlighted, fully opaque and vivid icon for the Google traffic app in the top row of the dynamic ribbon, placing a vivid and fully opaque icon for the BlackBerry traffic app somewhere on the dynamic ribbon in a position less prominent than the Google traffic application, placing a fully opaque icon which will automatically set the "read my email" mode somewhere on the dynamic ribbon but less prominently than the above two icons, and/or if icons for instant messaging (IM), email and voice activated dialing are on the dynamic ribbon then these should be made more transparent and moved below all other icons (perhaps even out of site below the "fold" of the ribbon).

Every time a user opens an application or performs a configuration change a positive training example is acquired by noting the user action and the current context. Similarly, periodically, negative training examples are acquired when the user does not perform an action. When the number of training examples crosses a threshold, they are sent to a training service where they are combined with any previously sent training examples from this user and possibly other data and used to train new models which are sent hack to the users device.

Here is an example of the system's adaptability. It is noted that whenever the user is in a context similar to the driving context described above, she does not launch the highlighted Google traffic app, but does launch a less prominent traffic application such as the Blackberry traffic application. This preference is recorded in the training examples and when a new model is trained the user will find that the next time she is in the driving context the BlackBerry traffic app is highlighted more prominently than the Google one.

Figure 4:
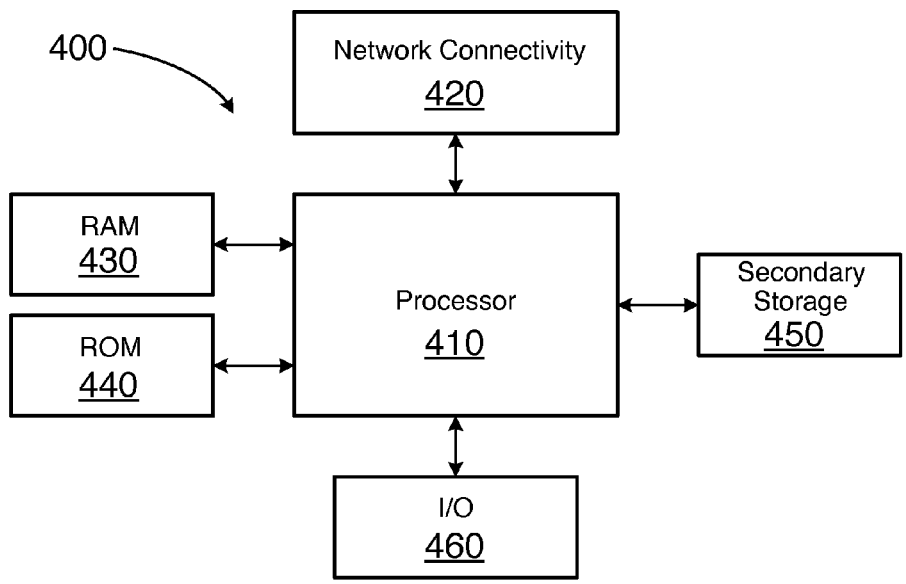
FIG. 4 depicts an exemplary system in which the present invention may be implemented.

Referring now to FIG. 4, an example of a system 400 suitable for implementing one or more embodiments disclosed herein is shown. In various embodiments, the system 400 comprises a processor 410, which may be referred to as a central processor unit (CPU) or digital signal processor (DSP), network connectivity devices 420, random access memory (RAM) 430, read only memory (ROM) 440, secondary storage 450, and input/output (I/O) devices 460. In some embodiments, some of these components may not be present or may be combined in various combinations with one another or with other components not shown. These components may be located in a single physical entity or in more than one physical entity. Any actions described herein as being taken by the processor 410 might be taken by the processor 410 alone or by the processor 410 in conjunction with one or more components shown or not shown in FIG. 4.

The processor 410 executes instructions, codes, computer programs, or scripts that it might access from the network connectivity devices 420, RAM 430, or ROM 440. While only one processor 410 is shown, multiple processors may be present. Thus, while instructions may be discussed as being executed by a processor 410, the instructions may be executed simultaneously, serially, or otherwise by one or multiple processors W10 implemented as one or more CPU chips.

In various embodiments, the network connectivity devices 420 may take the form of modems, modem banks, Ethernet devices, universal serial bus (USB) interface devices, serial interfaces, token ring devices, fiber distributed data interface (FDDI) devices, wireless local area network (WLAN) devices, radio transceiver devices such as code division multiple access (CDMA) devices, global system for mobile communications (GSM) radio transceiver devices, worldwide interoperability for microwave access (WiMAX) devices, and/or other well-known devices for connecting to networks. These network connectivity devices 420 may enable the processor 410 to communicate with the Internet or one or more telecommunications networks or other networks from which the processor 410 might receive information or to which the processor 410 might output information.

The network connectivity devices 420 may also be capable of transmitting or receiving data wirelessly in the form of electromagnetic waves, such as radio frequency signals or microwave frequency signals. Information transmitted or received by the network connectivity devices 420 may include data that has been processed by the processor 410 or instructions that are to be executed by processor 410. The data may be ordered according to different sequences as may be desirable for either processing or generating the data or transmitting or receiving the data.

In various embodiments, the RAM 430 may be used to store volatile data and instructions that are executed by the processor 410. The ROM 440 shown in FIG. 4 may be used to store instructions and perhaps data that are read during execution of the instructions. Access to both RAM 430 and ROM 440 is typically faster than to secondary storage 450. The secondary storage 450 is typically comprised of one or more disk drives or tape drives and may be used for non-volatile storage of data or as an over-flow data storage device if RAM 430 is not large enough to hold all working data. Secondary storage 450 may be used to store programs that are loaded into RAM 430 when such programs are selected for execution. The I/O devices 460 may include liquid crystal displays (LCDs), touch screen displays, keyboards, keypads, switches, dials, mice, track balls, voice recognizers, card readers, paper tape readers, printers, video monitors, or other well-known input/output devices.

Figure 5:
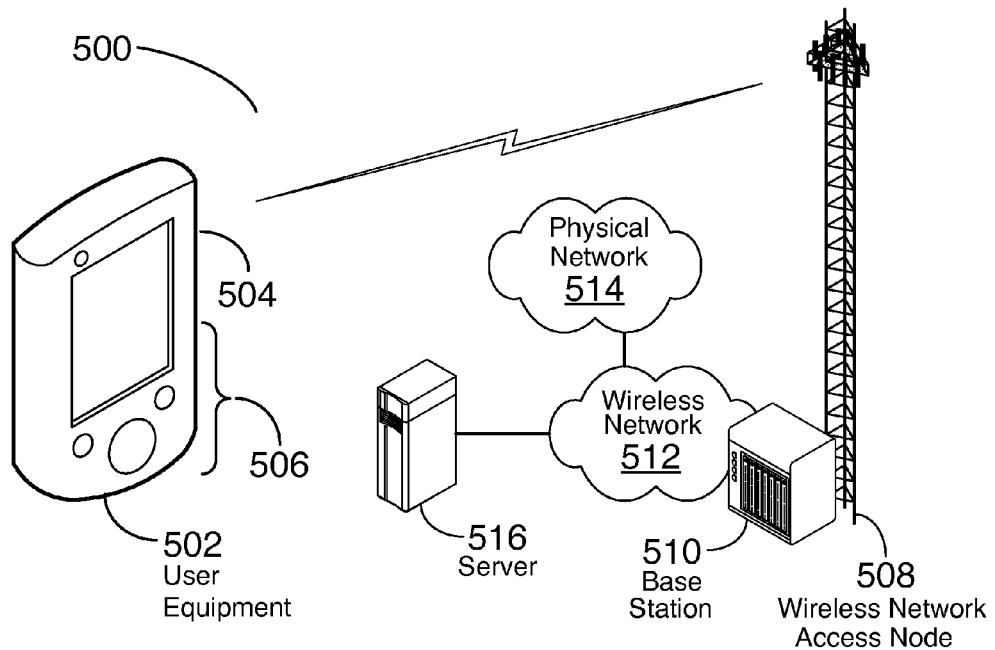
FIG. 5 shows a wireless communications system including an embodiment of a user equipment (UE).

FIG. 5 shows a wireless communications system including an embodiment of user equipment (UE) 502. Though illustrated as a mobile phone, the UE 502 may take various forms including a wireless handset, a pager, a personal digital assistant (PDA), a portable computer, a tablet computer, or a laptop computer. Many suitable devices combine some or all of these functions. In some embodiments, the UE 502 is not a general purpose computing device like a portable, laptop or tablet computer, but rather is a special-purpose communications device such as a mobile phone, a wireless handset, a pager, a PDA, or a telecommunications device installed in a vehicle. The UE 502 may likewise be a device, include a device, or be included in a device that has similar capabilities but that is not transportable, such as a desktop computer, a set-top box, or a network node. In these and other embodiments, the UE 502 may support specialized activities such as gaming, inventory control, job control, and/or task management functions, and so on.

In various embodiments, the UE 502 includes a display 504. The UE 502 likewise includes a touch-sensitive surface, a keyboard or other input keys 506 generally used for input by a user. In these and other environments, the keyboard may be a full or reduced alphanumeric keyboard such as QWERTY, Dvorak, AZERTY, and sequential keyboard types, or a traditional numeric keypad with alphabet letters associated with a telephone keypad. The input keys may likewise include a trackwheel, an exit or escape key, a trackball, and other navigational or functional keys, which may be inwardly depressed to provide further input function. The UE 502 may likewise present options for the user to select, controls for the user to actuate, and cursors or other indicators for the user to direct.

The UE 502 may further accept data entry from the user, including numbers to dial or various parameter values for configuring the operation of the UE 502. The UE 502 may further execute one or more software or firmware applications in response to user commands. These applications may configure the UE 502 to perform various customized functions in response to user interaction. Additionally, the UE 502 may be programmed or configured over-the-air (OTA), for example from a wireless base station 510, a server 516, a wireless network access node 508, or a peer UE 502.

Among the various applications executable by the UE 400 are a web browser, which enables the display 504 to display a web page. The web page may be obtained via wireless communications with a wireless network access node 508, such as a cell tower, a peer UE 502, or any other wireless communication network 512 or system. In various embodiments, the wireless network 512 is coupled to a wired network 514, such as the Internet. Via the wireless network 512 and the wired network 514, the UE 502 has access to information on various servers, such as a server 516. The server 516 may provide content that may be shown on the display 504. Alternately, the UE 502 may access the wireless network 512 through a peer UE 502 acting as an intermediary, in a relay type or hop type of connection. Skilled practitioners of the art will recognized that many such embodiments are possible and the foregoing is not intended to limit the spirit, scope, or intention of the disclosure.

Figure 6:
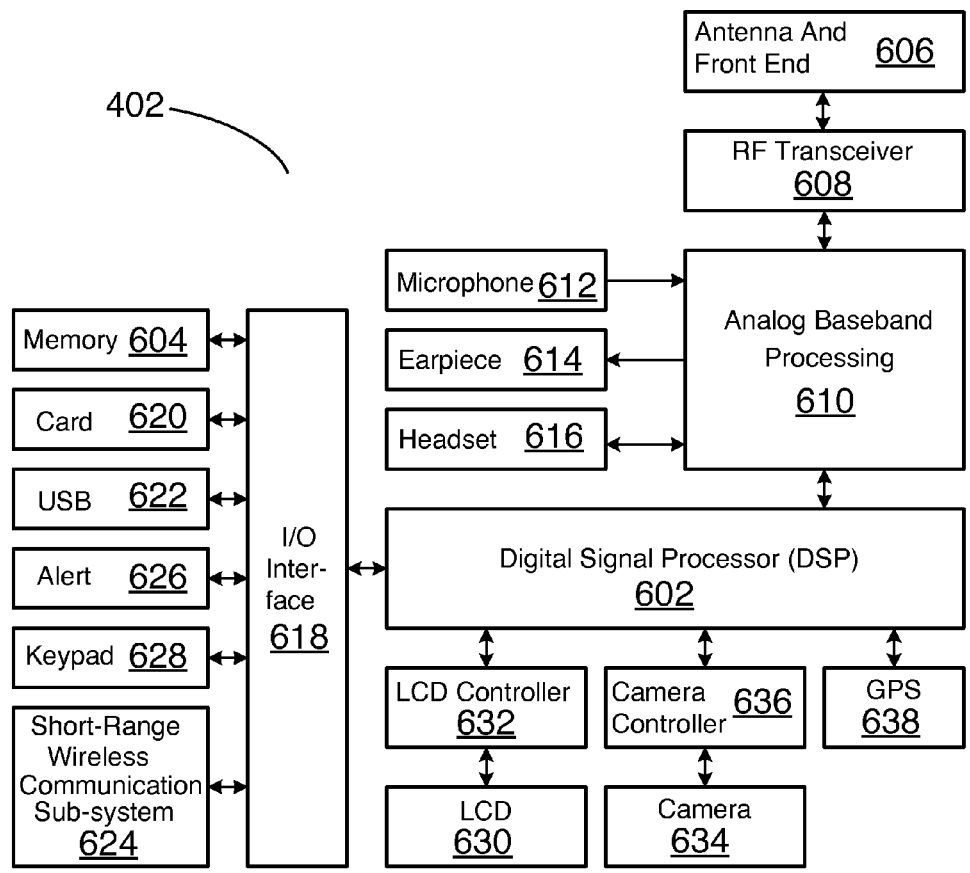
FIG. 6 is a simplified block diagram of an exemplary UE comprising a digital signal processor (DSP).

FIG. 6 depicts a block diagram of an exemplary user equipment (UE) 502 in which the present invention may be implemented. While various components of a UE 502 are depicted, various embodiments of the UE 502 may include a subset of the listed components or additional components not listed. As shown in FIG. 6, the UE 502 includes a digital signal processor (DSP) 602 and a memory 604. As shown, the UE 502 may further include an antenna and front end unit 606, a radio frequency (RF) transceiver 608, an analog baseband processing unit 610, a microphone 612, an earpiece speaker 614, a headset port 616, an input/output (I/O) interface 618, a removable memory card 620, a universal serial bus (USB) port 622, a short range wireless communication sub-system port 624, an alert 626, a keypad 628, a liquid crystal display (LCD) 630, which may include a touch sensitive surface, an LCD controller 632, a charge-coupled device (CCD) camera 634, a camera controller 636, and a global positioning system (GPS) sensor 638. In various embodiments, the UE 502 may include another kind of display that does not provide a touch sensitive screen. In an embodiment, the DSP 602 may communicate directly with the memory 604 without passing through the input/output interface 618.

In various embodiments, the DSP 602 or some other form of controller or central processing unit (CPU) operates to control the various components of the UE 502 in accordance with embedded software or firmware stored in memory 604 or stored in memory contained within the DSP 602 itself. In addition to the embedded software or firmware, the DSP 602 may execute other applications stored in the memory 604 or made available via information carrier media such as portable data storage media like the removable memory card 620 or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The antenna and front end unit 606 may be provided to convert between wireless signals and electrical signals, enabling the UE 502 to send and receive information from a cellular network or some other available wireless communications network or from a peer UE 502. In an embodiment, the antenna and front end unit 406 may include multiple antennas to support beam forming and/or multiple input multiple output (MIMO) operations. As is known to those skilled in the art, MIMO operations may provide spatial diversity which can be used to overcome difficult channel conditions or to increase channel throughput. Likewise, the antenna and front end unit 606 may include antenna tuning or impedance matching components, RF power amplifiers, or low noise amplifiers.

In various embodiments, the RF transceiver 608 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 610 or the DSP 602 or other central processing unit. In some embodiments, the RF Transceiver 408, portions of the Antenna and Front End 606, and the analog base band processing unit 610 may be combined in one or more processing units and/or application specific integrated circuits (ASICs).

The analog baseband processing unit 610 may provide various analog processing of inputs and outputs, for example analog processing of inputs from the microphone 612 and the headset 616 and outputs to the earpiece 614 and the headset 616. To that end, the analog baseband processing unit 610 may have ports for connecting to the built-in microphone 612 and the earpiece speaker 614 that enable the UE 502 to be used as a cell phone. The analog baseband processing unit 610 may further include a port for connecting to a headset or other hands-free microphone and speaker configuration. The analog baseband processing unit 610 may provide digital-to-analog conversion in one signal direction and analog-to-digital conversion in the opposing signal direction. In various embodiments, at least some of the functionality of the analog baseband processing unit 610 may be provided by digital processing components, for example by the DSP 602 or by other central processing units.

The DSP 602 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 602 may perform modulation, coding, interleaving, and spreading, and for a receiver function the DSP 602 may perform despreading, deinterleaving, decoding, and demodulation. In another embodiment, for example in an orthogonal frequency division multiplex access (OFDMA) technology application, for the transmitter function the DSP 602 may perform modulation, coding, interleaving, inverse fast Fourier transforming, and cyclic prefix appending, and for a receiver function the DSP 602 may perform cyclic prefix removal, fast Fourier transforming, deinterleaving, decoding, and demodulation. In other wireless technology applications, yet other signal processing functions and combinations of signal processing functions may be performed by the DSP 602.

The DSP 602 may communicate with a wireless network via the analog baseband processing unit 610. In some embodiments, the communication may provide Internet connectivity, enabling a user to gain access to content on the Internet and to send and receive e-mail or text messages. The input/output interface 618 interconnects the DSP 602 and various memories and interfaces. The memory 604 and the removable memory card 620 may provide software and data to configure the operation of the DSP 602. Among the interfaces may be the USB interface 622 and the short range wireless communication sub-system 624. The USB interface 622 may be used to charge the UE 502 and may also enable the UE 502 to function as a peripheral device to exchange information with a personal computer or other computer system. The short range wireless communication sub-system 624 may include an infrared port, a Bluetooth interface, an IEEE 802.11 compliant wireless interface, or any other short range wireless communication sub-system, which may enable the UE 502 to communicate wirelessly with other nearby mobile devices and/or wireless base stations.

The input/output interface 618 may further connect the DSP 602 to the alert 626 that, when triggered, causes the UE 502 to provide a notice to the user, for example, by ringing, playing a melody, or vibrating. The alert 626 may serve as a mechanism for alerting the user to any of various events such as an incoming call, a new text message, and an appointment reminder by silently vibrating, or by playing a specific pre-assigned melody for a particular caller.

The keypad 628 couples to the DSP 602 via the I/O interface 618 to provide one mechanism for the user to make selections, enter information, and otherwise provide input to the UE 502. The keyboard 628 may be a full or reduced alphanumeric keyboard such as QWERTY, Dvorak, AZERTY and sequential types, or a traditional numeric keypad with alphabet letters associated with a telephone keypad. The input keys may likewise include a trackwheel, an exit or escape key, a trackball, and other navigational or functional keys, which may be inwardly depressed to provide further input function. Another input mechanism may be the LCD 630, which may include touch screen capability and also display text and/or graphics to the user. The LCD controller 632 couples the DSP 602 to the LCD 630.

The CCD camera 634, if equipped, enables the UE 502 to take digital pictures. The DSP 602 communicates with the CCD camera 634 via the camera controller 636. In another embodiment, a camera operating according to a technology other than Charge Coupled Device cameras may be employed. The GPS sensor 638 is coupled to the DSP 602 to decode global positioning system signals, thereby enabling the UE 502 to determine its position. Various other peripherals may also be included to provide additional functions, such as radio and television reception.

Figure 7:
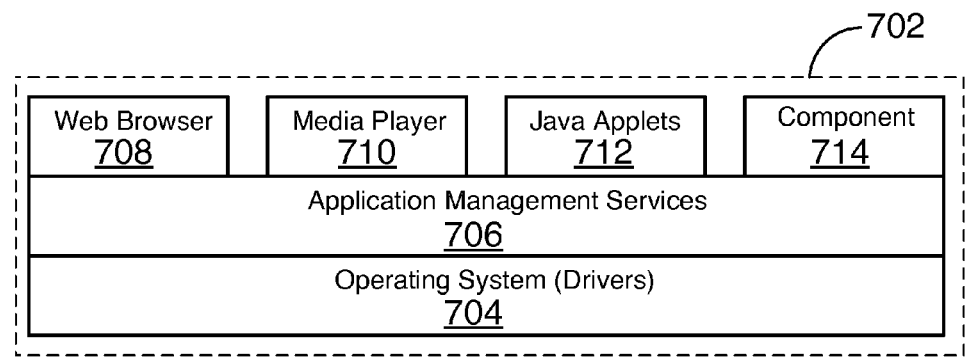
FIG. 7 is a simplified block diagram of a software environment that may be implemented by the DSP.

FIG. 7 illustrates a software environment 702 that may be implemented by the DSP 602. The DSP 602 executes operating system drivers 704 that provide a platform from which the rest of the software operates. The operating system drivers 704 provide drivers for the UE 502 hardware with standardized interfaces that are accessible to application software. The operating system drivers 704 include application management services (AMS) 706 that transfer control between applications running on the UE 502. Also shown in FIG. 7 are a web browser application 708, a media player application 710, and Java applets 712. The web browser application 708 configures the UE 502 to operate as a web browser, allowing a user to enter information into forms and select links to retrieve and view web pages. The media player application 710 configures the UE 502 to retrieve and play audio or audiovisual media. The Java applets 712 configure the UE 502 to provide games, utilities, and other functionality. A component 714 might provide functionality described herein. The UE 502, a base station 510, and other components described herein might include a processing component that is capable of executing instructions related to the actions described above.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

As used herein, the terms "component," "system" and the like are intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a computer and the computer can be a component. One or more components may reside within a process and/or thread of execution and a component may be localized on one computer and/or distributed between two or more computers.

As used herein, the terms "user equipment" and "UE" can refer to wireless devices such as mobile telephones, personal digital assistants (PDAs), handheld or laptop computers, and similar devices or other user agents ("UAs") that have telecommunications capabilities. In some embodiments, a UE may refer to a mobile, wireless device. The term "UE" may also refer to devices that have similar capabilities but that are not generally transportable, such as desktop computers, set-top boxes, or network nodes.

Furthermore, the disclosed subject matter may be implemented as a system, method, apparatus, or article of manufacture using standard programming and/or engineering techniques to produce software, firmware, hardware, or any combination thereof to control a computer or processor based device to implement aspects detailed herein. The term "article of manufacture" (or alternatively, "computer program product") as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick). Of course, those skilled in the art will recognize many modifications may be made to this configuration without departing from the scope or spirit of the claimed subject matter.

The word "exemplary" is used herein to mean serving as an example, instance, or illustration. Any aspect or design described herein as "exemplary" is not necessarily to be construed as preferred or advantageous over other aspects or designs. Those of skill in the art will recognize many modifications may be made to this configuration without departing from the scope, spirit or intent of the claimed subject matter. Furthermore, the disclosed subject matter may be implemented as a system, method, apparatus, or article of manufacture using standard programming and engineering techniques to produce software, firmware, hardware, or any combination thereof to control a computer or processor-based device to implement aspects detailed herein.

Also, techniques, systems, subsystems and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component, whether electrically, mechanically, or otherwise. Other examples of changes, substitutions, and alterations are ascertainable by one skilled in the art and may be made without departing from the spirit and scope disclosed herein. Although the present invention has been described in detail, it should be understood that various changes, substitutions and alterations can be made hereto without departing from the spirit and scope of the invention as defined by the appended claims.

What is claimed is:

1. A method for modifying a portable electronic device by predicting user behavior, the method comprising:
    predicting user behavior via an algorithm configured based on training data that includes training examples, a positive training example including the user performing a specific action and a negative training example including the user not performing a specific action, the predicting user behavior comprising determining a likelihood of occurrence for each of a plurality of possible user actions; and
    modifying the portable electronic device based upon the determined likelihoods, the modifying comprising applying a plurality of preferences to the portable electronic device, each of the plurality of preferences being associated with at least one user action of the plurality of user actions, wherein the modifying step further includes sorting the user actions by the determined likelihoods, and modifying the display based on the determined likelihood after discarding the user actions having lower than a threshold likelihood.

2. The method of claim 1, further comprising:
    using contextual information when predicting user behavior,
    wherein the contextual information comprises any data that can be electronically measured or derived about the device, software running on the device, and data gathered off-device by connecting via a communications interface to other devices.

3. The method of claim 1, wherein applying the preferences includes modifying an internal state of the portable electronic device, the modifying the internal state of the portable electronic device comprising at least one of
    loading information into volatile memory from non-volatile memory;
    loading information into volatile memory or non-volatile memory from an off-device location;
    executing an application;
    executing an application with dynamically created arguments;
    executing a configuration task; and
    executing a configuration task with dynamically created arguments.

4. The method of claim 1, wherein applying the preferences includes improving the accessibility of information by making the information known to the user; and the making the information known to the user comprises at least one of:
    displaying the information on a graphical user interface by fronting the information above all other information;
    making the information easy to identify by placing the information in a well known location on the graphical user interface;
    making the information more noticeable through the use of distinct fonts;
    making the information more noticeable through the use of colors;
    making the information more noticeable through the use of visual effects;
    playing audible sounds; and
    vibrating the device in a unique way.

5. The method of claim 1, wherein applying the preferences includes improving ease of performing a user action; and
    the improving ease of performing comprising at least one of:
    modifying a location of an icon to perform the user action;
    ensuring that an icon to perform the task is visible; and
    modifying an appearance of the icon that performs the action, the modifying comprising at least one of:
    increasing a size of the icon;
    modifying a background of the icon;
    modifying a color scheme of the icon;
    increasing transparency of the icon with respect to other icons; and
    adding animation effects to the icon.

6. The method of claim 5, wherein the icon represents one of:
    an existing application;
    an existing application with dynamically created arguments;
    a configuration task which may modify the state or configuration of the device; and a configuration task which may modify the state or configuration of the device with dynamically created arguments.

7. The method of claim 1, wherein contextual information also includes data derived from the contextual information by applying algorithms to the contextual information, the method further comprising
augmenting the contextual information with newly created data to generate an augmented set of contextual information; and
applying algorithms to the augmented set of contextual information to provide a further augmented set of contextual information, an output of the further augmented set being added to the set of contextual information.

8. The method of claim 1, further comprising:
recording the contents of a current context along with each positive or negative training example.

9. The method of claim 1, wherein the training data is further gathered from multiple different users.

10. The method of claim 1, wherein the training data is modified over time by adding training examples from a specific user.

11. The method of claim 1, wherein the training data consists only of positive examples.

12. The method of claim 1, wherein the training examples are performed off the device by a remote service.

13. The method of claim 1, further comprising facilitating the at least one possible user action, the facilitating comprising at least one of directly facilitating the at least one possible user action and indirectly facilitating the at least one possible user action.

14. A non-transitory computer-readable medium storing instructions for modifying a portable electronic device by predicting user behavior, wherein the instructions, when executed by a processor, cause the processor to perform a method comprising:
predicting user behavior via an algorithm configured based on training data that includes training examples, a positive training example including the user performing a specific action and a negative training example including the user not performing a specific action, the predicting user behavior comprising determining a likelihood of occurrence for each of a plurality of possible user actions; and modifying the portable electronic device based upon the determined likelihoods, the modifying comprising applying a plurality of preferences to the portable electronic device, each of the plurality of preferences being associated with at least one user action of the plurality of user actions, wherein the modifying step further includes sorting the user actions by the determined likelihoods, and modifying the display based on the determined likelihood after discarding the user actions having lower than a threshold likelihood.

15. A device, comprising:

processing circuitry configured to predict user behavior via an algorithm configured based on training data that includes training examples, a positive training example including the user performing a specific action and a negative training example including the user not performing a specific action, the predicting user behavior comprising determining a likelihood of occurrence for each of a plurality of possible user actions; and modify the device based upon the determined likelihoods, the modifying comprising applying a plurality of preferences to the device, each of the plurality of preferences being associated with at least one user action of the plurality of user actions, wherein the modifying step further includes sorting the user actions by the determined likelihoods, and modifying the display based on the determined likelihood after discarding the user actions having lower than a threshold likelihood.

* * * * *